(12) United States Patent
Nishida

(10) Patent No.: US 8,943,339 B2
(45) Date of Patent: *Jan. 27, 2015

(54) DATA PROCESSING APPARATUS

(75) Inventor: Yoichi Nishida, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 187 days.

This patent is subject to a terminal disclaimer.

(21) Appl. No.: 13/561,497

(22) Filed: Jul. 30, 2012

(65) Prior Publication Data

US 2012/0297213 A1    Nov. 22, 2012

Related U.S. Application Data

(63) Continuation of application No. 12/305,758, filed as application No. PCT/JP2008/000748 on Mar. 27, 2008, now Pat. No. 8,261,110.

(30) Foreign Application Priority Data

May 21, 2007   (JP) ................................. 2007-134135

(51) Int. Cl.
| | | |
|---|---|---|
| *G06F 1/00* | (2006.01) | |
| *G06F 1/26* | (2006.01) | |
| *G06F 1/32* | (2006.01) | |

(Continued)

(52) U.S. Cl.
CPC ............ *G06F 1/3237* (2013.01); *G06F 1/3228* (2013.01); *G06F 1/324* (2013.01); *H04N 21/4135* (2013.01); *H04N 21/4147* (2013.01); *H04N 21/43637* (2013.01); *H04N 21/4436* (2013.01); *H04W 52/029* (2013.01);

(Continued)

(58) Field of Classification Search
USPC .................................................. 713/310, 322
See application file for complete search history.

(56) References Cited

U.S. PATENT DOCUMENTS

| | | | |
|---|---|---|---|
| 8,107,418 B2* | 1/2012 | Oh ................................ | 370/328 |
| 8,261,110 B2* | 9/2012 | Nishida ........................ | 713/310 |
| 2005/0286422 A1* | 12/2005 | Funato .......................... | 370/235 |
| 2007/0061600 A1* | 3/2007 | Kuroda et al. ................ | 713/300 |
| 2007/0146775 A1 | 6/2007 | Maeda | |

FOREIGN PATENT DOCUMENTS

| | | |
|---|---|---|
| EP | 1292040 A2 | 3/2003 |
| EP | 1526659 A1 | 4/2005 |

(Continued)

OTHER PUBLICATIONS

European Search Report for Application No. 08720627.2-1959/2056554 PCT/JP2008/000748 dated Mar. 5, 2013.

*Primary Examiner* — Kim Huynh
*Assistant Examiner* — Vincent Chang
(74) *Attorney, Agent, or Firm* — Pearne & Gordon LLP

(57) ABSTRACT

A data transmitting apparatus for processing data to be transmitted to a data receiving apparatus which reproduces received data stored in a received data storage unit, comprising: a signal processor for processing data; a transmitter for wirelessly transmitting the data processed in the signal processor to the data receiving apparatus; a signal processing controller for controlling the signal processor to operate intermittently; a clock/power controller for restricting a clock signal supply and/or power supply to the signal processing controller during a non-operating time period of the intermittent operation; and a wake-up controller for lifting the restriction put by the clock/power controller based on an amount of data stored in the received data storage unit.

4 Claims, 9 Drawing Sheets

(51) Int. Cl.
*H04N 21/41* (2011.01)
*H04N 21/4147* (2011.01)
*H04N 21/4363* (2011.01)
*H04N 21/443* (2011.01)
*H04W 52/02* (2009.01)

(52) U.S. Cl.
CPC .......... *Y02B60/1217* (2013.01); *Y02B 60/1221* (2013.01); *Y02B 60/50* (2013.01)
USPC ............................ 713/310; 713/300; 713/320

(56) References Cited

FOREIGN PATENT DOCUMENTS

| | | |
|---|---|---|
| JP | 2003-087185 A | 3/2003 |
| JP | 2004-260454 A | 9/2004 |
| JP | 2006-133698 A | 5/2006 |
| JP | 2007-098920 A | 4/2007 |

\* cited by examiner

DATA PROCESSING APPARATUS

This application is a continuation of U.S. patent application Ser. No. 12/305,758 filed Dec. 19, 2008, which is incorporated herein by reference in its entirety.

TECHNICAL FIELD OF THE INVENTION

The present invention relates to a data processing apparatus, especially to a data processing apparatus for processing audio-visual data and broadcast signals to be reproduced.

BACKGROUND ART OF THE INVENTION

As a typical conventional data processing apparatus, a transmitting apparatus 105 as shown in FIG. 8 comprises a content data storage unit 115 for storing various types of content data received through a network, a signal processing unit 125 for converting the content data into a specified format signal reproducible on a receiving apparatus 205, a transmitting data storage unit 135 for storing the converted specified format signal, and a wireless communication unit 145 for wirelessly transmitting the converted specified format signal stored in the transmitting data storage unit 135 to the receiving apparatus 205 functioning as a data reproducing apparatus. The conventional data processing apparatus provides an excellent operability by wireless communication between the data processing apparatus and the data reproducing apparatus, thereby omitting cable connecting works and cable disconnecting works. (See Patent Document 1)

Another conventional data processing apparatus as shown in FIG. 9 comprises a broadcast wave receiving unit 196 for receiving a broadcast wave, a signal processing unit 126 for decoding data received by the broadcast wave receiving unit 196, an output data storage unit 136 for storing decoded data decoded in the signal processing unit 126, an output unit 146 for outputting the data stored in the output data storage unit 136, a control unit 156 for controlling operations of each of the units of the apparatus, a power unit 166 for controlling power supplies for the broadcast wave receiving unit 196, the signal processing unit 126 and the output data storage unit 136, and a timer unit 176 for triggering the control unit 156 to start up. The above conventional data processing apparatus receives and decodes the broadcast data that is updated a few times per day by intermittently operating the broadcast wave receiving unit 196 and the signal processing unit 126. (See Patent Document 2)

In the conventional data processing apparatus, the broadcast wave receiving unit 196, the data processing unit 126 and the output data storage unit 136 are powered by the power unit 166 controlled by the control unit 156 which is triggered by the timer unit 176 at the time of receiving the broad cast data.

Then, a broadcast wave received by the broadcast wave receiving unit 196 is decoded in the signal processing unit 126, and is stored in the output data storage unit 136. After completing the above processes, the control unit 156 controls the broadcast wave receiving unit 196, the signal processing unit 126 and the output data storage unit 136 to stop processing and controls the power unit 166 so that the power unit 166 stops supplying the power.

As above explained, the conventional data processing apparatus decreases the power consumption in a stand-by state by stopping the supply of power during a non-operating time period between intermittent operations.

[Patent Document 1] Japanese Patent Laid-Open Publication (Kokai) No. 2007-36886

[Patent Document 2] Japanese Patent Laid-Open Publication (Kokai) No. 11-122586

DISCLOSURE OF THE INVENTION

Problem to be Solved by the Invention

The data processing apparatus disclosed in Patent Document 1, however, has a problem in that the power consumption is not decreased because of a so-called offset current consumed by merely supplying an electric power and a clock signal to each unit as the apparatus is always active, though the operability of the apparatus is improved by making wireless communication between the data processing apparatus and the data reproducing apparatus.

The data processing apparatus disclosed in Patent Document 2 has a problem in that the power consumption is not decreased when applied for processing continuous data, for example, when the apparatus reproduces audio-visual data or a broadcast signal, though the apparatus decreases the power consumption when applied for receiving data renewed a few times per day.

In order to solve the problems mentioned above, it is an object of the present invention to provide a data processing apparatus enabling the power consumption to be decreased for processing and wirelessly transmitting continuous data such as audio-visual data and a broadcast signal to a data reproducing apparatus.

Means for Solving the Problem

A data processing apparatus according to the present invention is an apparatus which processes data to be transmitted to a data reproducing apparatus which reproduces received data in real-time processing while temporarily storing the received data in a received data storage unit, comprising:

a data storage unit for storing data;

a signal processing unit for reading out and processing the data stored in said data storage unit;

a wireless communication unit for wirelessly transmitting the data processed in said signal processing unit to said data reproducing apparatus;

a signal processing control unit for controlling said signal processing unit so that said signal processing unit is able to work intermittently by processing data at a processing speed faster than a real-time processing speed;

a clock/power control unit for controlling a supply of at least one of clock signals and power supplies to said signal processing unit and said signal processing control unit so that the power consumption of said signal processing unit and said signal processing control unit is decreased by controlling the supply of at least one of the clock signals and the power supplies to at least one part of said signal processing unit and said signal processing control unit during a non-operating time period of said intermittent operation; and a start-up control unit for controlling a start-up process to request a release of controlling the supply of at least one of the clock signals and the power supplies to at least one part of said signal processing unit and said signal processing control unit to said clock/power control unit, and to request transferring to an operating time period of said intermittent operation to said signal processing control unit based on an amount of data stored in said received data storage unit.

Effect of the Invention

The present invention can provide a data processing apparatus enabling the power consumption to be decreased for processing and wirelessly transmitting signals of continuous data such as audio-visual data and a broadcast signal to a data reproducing apparatus.

EXPLANATIONS OF LETTERS AND NUMERALS 100, 300, 500, 700: Data Processing Apparatus
105: Transmitting Apparatus
110: Data Storage Unit
115: Content Data Storage Unit
120: First signal Processing Unit
125, 126: Signal Processing Unit
130: Sending Data Storage Unit
135: Transmitting Data Storage Unit
136: Output Data Storage Unit
140: First Wireless Communication Unit
145: Wireless Communication Unit
146: Output Unit
150: Signal Processing Control Unit
156: Control Unit
160: Clock/Power Control Unit
166: Power Unit
170: Trigger Signal Generating Unit
176: Timer Unit
180: Start-Up Control Unit
190: Transmitting Data Monitoring Unit
196: Broadcast Receiving Unit
200, 400, 600, 800: Data Reproducing Apparatus
205: Receiving Apparatus
220: Second Data Processing Unit
230: Received Data Storage Unit
240: Second Wireless Communication Unit
290: Received Data Monitoring Unit

[Preferred Embodiment of the Invention]

Hereafter, embodiments of the present invention will be explained with reference to the attached drawings.

(First Embodiment)

Figure 1:
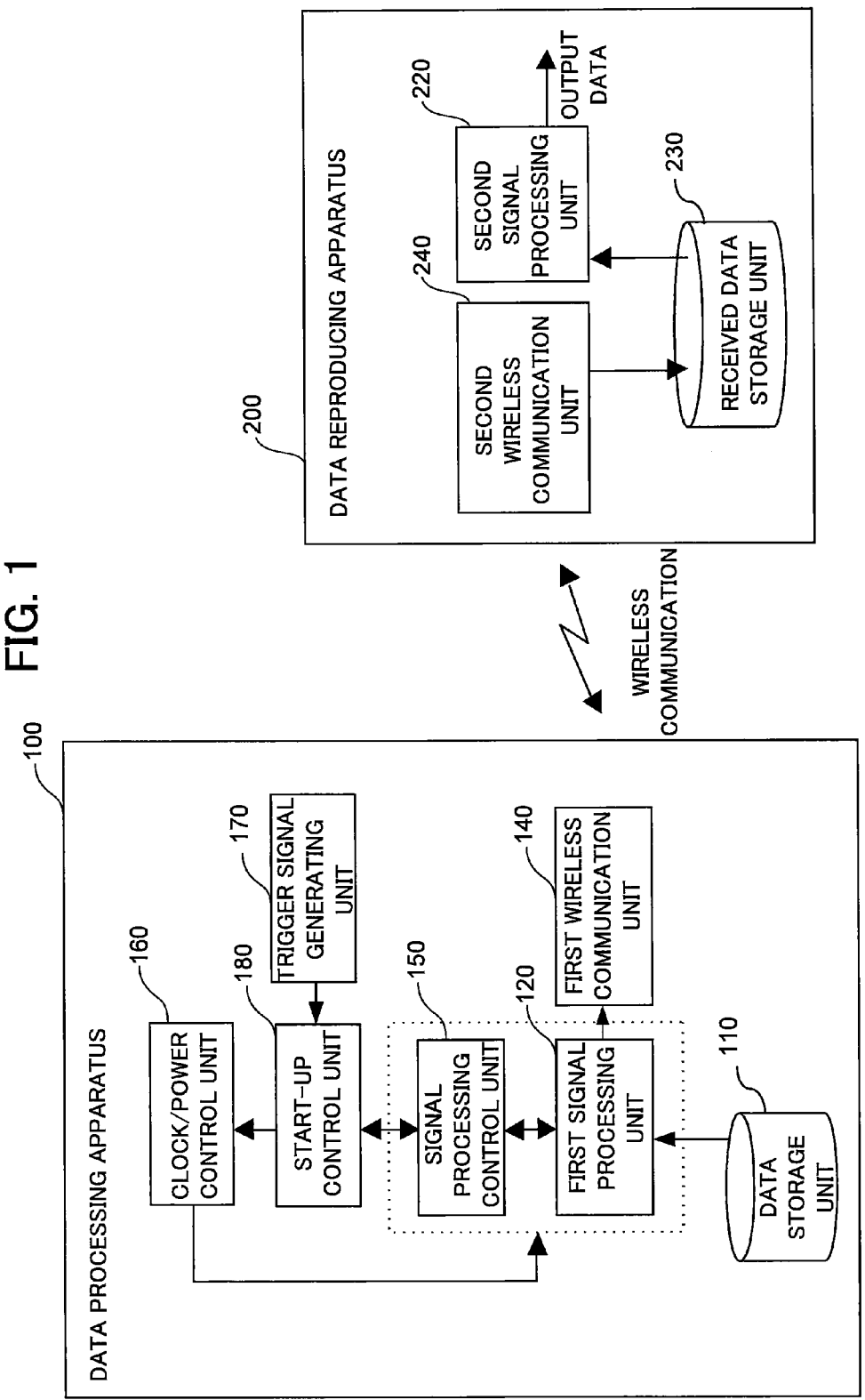
FIG. 1 is a block diagram of a data processing apparatus and a data reproducing apparatus according to a first embodiment of the present invention.

FIG. 1 shows a data processing apparatus and a data reproducing apparatus according to the first embodiment of the present invention.

As shown in FIG. 1, a data processing apparatus 100 comprises a data storage unit 110 for storing data, a first signal processing unit 120 for reading out and processing the data stored in the data storage unit 110, a first wireless communication unit 140 for wirelessly transmitting the data processed in the first signal processing unit 120 to a data reproducing apparatus 200, a signal processing control unit 150 for controlling the first signal processing unit 120 so as to work intermittently, a clock/power control unit 160 for controlling a supply of at least one of clock signals and power supplies to at least one part of the first signal processing unit 120 and the signal processing control unit 150, a start-up control unit 180 for controlling the clock/power control unit 160, and a trigger signal generating unit 170 for generating a trigger signal to the start-up control unit 180 at a timing when the clock/power control unit 160 is to be controlled.

Further, the data reproducing apparatus 200 comprises a second wireless communication unit 240 for receiving the data wirelessly transmitted from the first wireless communication unit 140, a received data storage unit 230 for temporarily storing the data received by the second wireless communication unit 240, and a second signal processing unit 220 for real-time processing and outputting the data read out from the received data storage unit 230.

In this embodiment, the data processing apparatus 100 is a mobile phone, the data reproducing apparatus 200 is a stereo headphones for a wireless communication system such as Bluetooth (Registered Trademark), and the data reproducing apparatus 200 reproduces music data stored in the data processing apparatus 100 wirelessly transmitted to the data reproducing apparatus 200.

The data storage unit 110 is composed of a memory card. The data stored in the data storage unit 110 is compressed audio data encoded in AAC (Advanced Audio Coding).

The first signal processing unit 120 is comprised of a DSP (Digital Signal Processor), and works so as to decode the compressed data stored in the data storage unit 110 to corresponding PCM (Pulse Code Modulation) data by a software process of the DSP.

Further, the first signal processing unit 120 works so as to encode the PCM data to SBC (Sub-band Coding) data which can be reproduced by the data reproducing apparatus 200, and then to generate a plurality of packet data by performing a protocol process according to the communication protocol of the Bluetooth.

The first wireless communication unit 140 and the second wireless communication unit 240 work so as to send/receive the packet data by executing wireless communication compliant with the Bluetooth specifications.

The signal processing control unit 150 is composed of a processor such as a microcomputer system to control each unit of the data processing apparatus 100, and works so as to control, for example, the first signal processing unit 120 to start or stop processing.

Especially, the signal processing control unit 150 works so as to control the first signal processing unit 120 so that the first signal processing unit 120 works intermittently by processing data at a speed faster than a real-time processing speed.

For more detail, the signal processing control unit 150 works so as to indicate an amount of data to be processed by the first signal processing unit 120, and then request a halt command to the start-up control unit 180 after receiving information on completion of processing data of the indicated amount from the first signal processing unit 120. Thereafter, the signal processing control unit 150 works so as to indicate the amount of data to be processed to the first signal processing unit 120 again when receives a start-up command from the start-up control unit 180.

As a result, the first signal processing unit 120 intermittently works so that the active state where the data is being processed and the halt state where the data processing is halted are repeated alternately.

The trigger signal generating unit 170 having a timer, works so as to estimate a timing when the amount of data stored in the received data storage unit 230 becomes less than a threshold amount based on the transmitting rate of the packet data transmitted from the first wireless communication unit 140 and the data reading out speed read out in real-time by the second signal processing unit 220, and to output a trigger signal at the timing to the start-up control unit 180.

Where, the threshold amount is preliminary determined so that the amount of data stored in the received data storage unit 230 which is read out in real-time processing by the second signal processing unit 220 does not reach to null.

The start-up control unit 180 works so as to execute a halt control process for outputting a restriction request signal which requests the restriction of the supply of at least one of the clock signals and the power supplies supplied to at least one part of the first signal processing unit 120 and the signal processing control unit 150 to the clock/power control unit 160 in accordance with a halt request from the signal processing control unit 150. Where, the at least one part of the signal processing control unit 150 includes a part for controlling the first signal processing unit 120.

Further, the start-up control unit 180 works so as to execute a start-up control process to output a release request signal which requests the release of the restriction required during the halt control process to the clock/power control unit 160 in accordance with the trigger signal output from the trigger signal generating unit 170, and to force the signal processing unit 150 to transfer to an operating time period in the intermittent operation.

The clock/power control unit 160 works so as to reduce the power consumption of the data processing apparatus 100 by restricting the supply of at least one of the clock signals and the power supplies supplied to at least one part of the first signal processing unit 120 and the signal processing control unit 150 in accordance with the restriction request signal output from the start-up control unit 180. Further, the clock/power control unit 160 works so as to release the restriction in accordance with the release request signal output from the start-up control unit 180.

The clock/power control unit 160 works so as to control a clock generator, not shown, for generating the clock signals so that the clock generator performs any one of stopping the supply of the clock signals, lowering the frequency of the clock signals or lowering the amplitude of the clock signals, when restricting the supply of the clock signals to at least one part of the first signal processing unit 120 and the signal processing control unit 150.

The clock/power control unit 160 works so as to control a power supply circuit, not shown, for supplying the power supplies so that the power supply circuit performs any one of stopping the supply of the power supplies or lowering the voltage of the power supplies, when restricting the supply of the power supplies to at least one part of the first signal processing unit 120 and the signal processing control unit 150.

The received data storage unit 230 is comprised of a semiconductor memory and works so as to store the SBC data which is converted from the packet data received by the second wireless communication unit 240.

The second signal processing unit 220 works so as to read out the SBC data from the received data storage unit 230 in real-time processing, and output an analog audio signal which is converted from the PCM data decoded from the SBC data read out.

Figure 2:
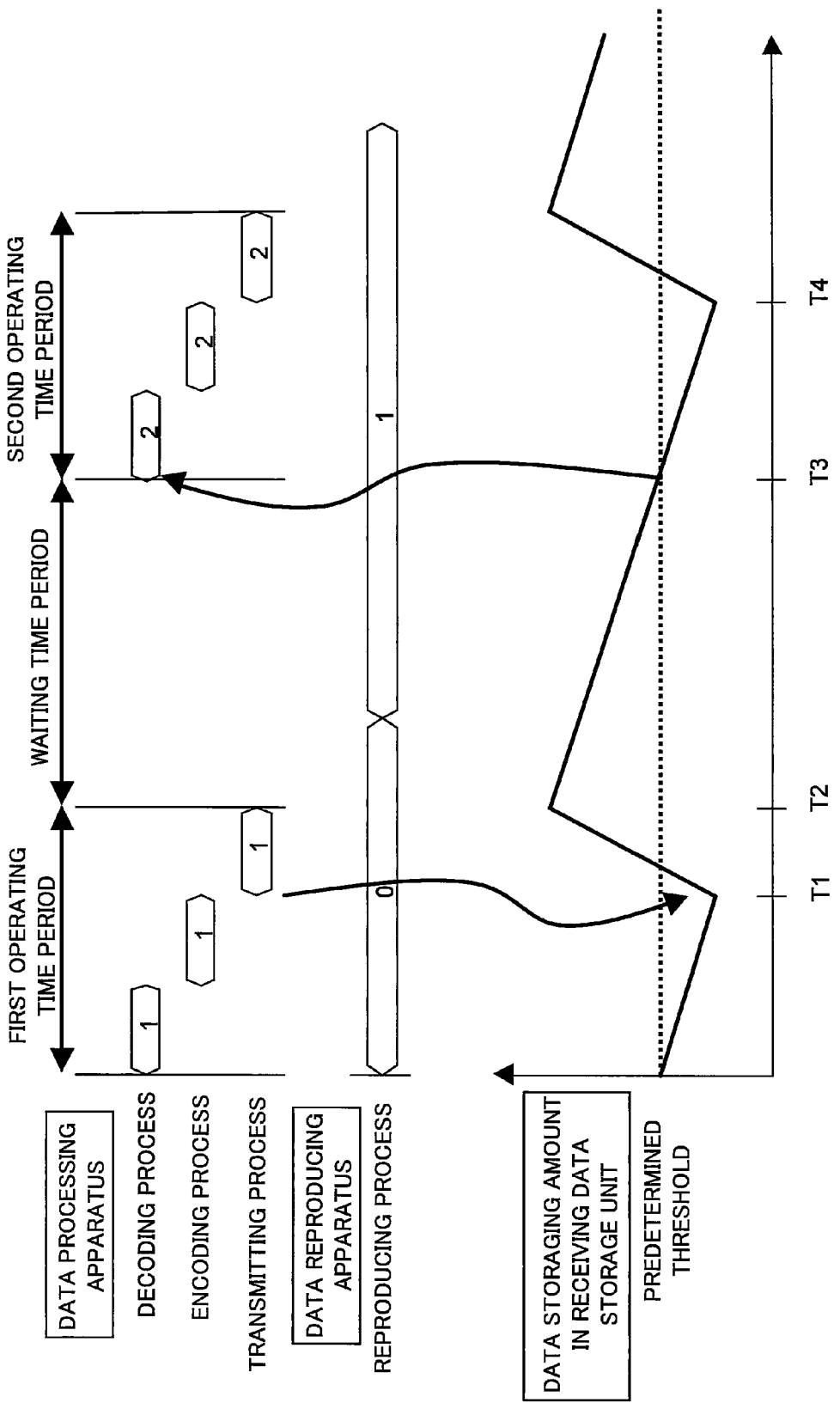
FIG. 2 is a timing chart of the data processing apparatus and the data reproducing apparatus according to the first embodiment of the present invention.

Hereafter, the behavior of the data processing apparatus 100 and the data reproducing apparatus 200 thus constructed as above will be explained with referring to FIG. 2. Where, the data processing apparatus 100 and the data reproducing apparatus 200 process data in a unit of frame which is a processing unit of the AAC data and the SBC data.

In the first operating time period, the data processing apparatus 100 continuously performs a decoding process of a predetermined number of frames (for example, 10 frames) of the AAC data. The data processing apparatus 100 then performs an SBC process for encoding the decoded data to the SBC data, and a protocol process for converting the SBC data into packet data.

Then, the wireless transmitting process for wirelessly transmitting the packet data to the data reproducing apparatus 200 is performed. When the wireless transmitting process is completed, the data processing apparatus 100 is transferred into a waiting time period, i.e. a non-operating time period, of the intermittent operation. In the waiting time period, the data processing apparatus 100 goes into a power saving state where the supply of the clock signals and the power supplies to at least one part of the first signal processing unit 120 and the signal processing control unit 150 is stopped.

On the other hand, the data reproducing apparatus 200 continuously performs a reproducing process in real-time processing comprised of a decoding process for decoding the SBC data obtained from the packet data received from the data processing apparatus 100 and a converting process for converting the PCM data decoded from the SBC data into an analog signal. Therefore, the SBC data stored in the received data storage unit 230 is read out as needed and consumed by the second signal processing unit 220.

As a result, the amount of data stored in the received data storage unit 230 is rapidly increased, because the data, the amount thereof is more than that of the data processed in the second signal processing unit 220, are transmitted from the data processing apparatus 100 between the time T1 and the time T2.

On the other hand, the amount of data stored in the received data storage unit 230 decreases after the time T2 because the transmission of data from the data processing apparatus 100 is halted, and the second signal processing unit 220 continuously reads out the data stored in the received data storage unit 230.

When the timing of the time T3 at which the amount of data stored in the received data storage unit 230 becomes less than a threshold amount is determined by the trigger signal generating unit 170, the data processing apparatus 100 resumes processing data and starts transmitting the processed data again at the time T4. Where, the threshold amount for the amount of data stored in the received data storage unit 230 is determined so that the amount of data stored in the received data storage unit 230 does not reach to null at the time T4.

The data processing apparatus 100 and the data reproducing apparatus 200 work as above-explained, thus continuous data reproducing is achieved without drying out the data stored in the received data storage unit 230.

For example, the reproducing time for reproducing 10 frames of the data sampled at a 48 kHz sampling frequency is about 200 milliseconds, and continuous data reproducing will be achieved if the data processing apparatus 100 can finish the data processing within this 200 milliseconds. When the first signal processing unit 120 can decode the data 10 times faster than normal, the data included in 10 frames will be processed in 20 milliseconds.

Further, if the data processing apparatus 100 can complete each of the SBC process and the wireless transmitting process in 10 milliseconds, the apparatus can complete all processes from the decoding process to the wireless transmitting process in a total of 40 milliseconds. Therefore, if the apparatus can complete the process in 40 milliseconds during this 200 milliseconds time period, an 80% of 200 milliseconds becomes a waiting time period.

The data processing apparatus 100 according to the first embodiment of the present invention as above explained restricts at least one of the clock signals and the power supplies to at least one part of the first signal processing unit 120 and the signal processing control unit 150 during the waiting time period of the intermittent operation, thus the power consumption for processing the data of musical content and wirelessly transmitting the data to the data reproducing apparatus 200 can be reduced.

In the above embodiment, the case where the data processing apparatus 100 is comprised of a mobile phone is explained. But the present invention is not limited to this case. The data processing apparatus 100 may be composed of a mobile audio-visual terminal such as a portable music player.

Further, in the above embodiment, the case where the first wireless communication unit 140 and the second wireless communication unit 240 execute wireless communication compliant with the Bluetooth specifications is explained. But the present invention is not limited to this case. The first wireless communication unit 140 and the second wireless communication unit 240 may execute wireless communication compliant with a wireless communication system which allows transmission of audio-visual data such as an infrared communication.

Moreover, in the above embodiment, the case where the data storage unit 110 is composed of a memory card is explained. But the present invention is not limited to this case. The data storage unit 110 may be composed of a storage medium capable of storing audio-visual data such as a magnetic tape, a magnetic disk, a semiconductor memory, or a hard disk.

Further, in the above embodiment, the case where the data stored in the data storage unit 110 is the compressed audio data encoded in AAC is explained. But the present invention is not limited to this case. The data stored in the data storage unit 110 may be compressed data of digital audio data such as MP3 (MPEG Audio Layer-3) data.

Moreover, the data stored in the data storage unit 110 may be moving image data such as MPEG-4 video data or still image data such as JPEG (Joint Photographic Experts Group).

Further, the data stored in the data storage unit 110 may be a cryptograph encrypted in the DES (Data Encryption Standard) or the AES (Advanced Encryption Standard). In this case, the first signal processing unit 120 is configured so as to further perform an encryption decoding process.

Moreover, in the above embodiment, the case where the first signal processing unit 120 performs the decoding process of AAC, the SBC process, and the protocol process is explained. But the present invention is not limited to this case. The first signal processing unit 120 may perform a part of the above processes, so long as the data reproducing apparatus 200 can reproduce the data.

Additionally, in the above embodiment, the case where the second signal processing unit 220 performs the converting process to analog signals is explained. But, the present invention is not limited to this case. The second signal processing unit 220 may not perform the converting process to analog signals when the output unit of the second signal processing unit 220 is a unit which requires inputting digital data such as a liquid crystal display panel.

Further, in the above embodiment, the case where the first signal processing unit 120 performs the transcoding process from the AAC data to the SBC data is explained. But, the present invention is not limited to this case. The first signal processing unit 120 may perform the following processes;

a frequency converting process for converting the sampling frequency of original data so that the data reproducing apparatus 200 can reproduce the frequency converted data when the apparatus does not accept the sampling frequency of the original data, a spatial resolution converting process for converting the spatial resolution of original data so that the data reproducing apparatus 200 can reproduce the spatial resolution converted data when the apparatus does not accept the spatial resolution of the original data, a frame rate converting process for converting the frame rate of original data so that the data reproducing apparatus 200 can reproduce the frame rate converted data when the apparatus does not accept the frame rate of the original data, and a format converting process for converting the format of original data so that the data reproducing apparatus 200 can reproduce the format converted data when the apparatus does not accept the format of the original data.

Moreover, in the above embodiment, the case where the first signal processing unit 120 is composed of a DSP is explained. But, the present invention is not limited to this case. The first signal processing unit 120 may be composed of another type of processors such as a CPU (Central Processing Unit), or partially or wholly by hardware.

Further, in the above embodiment, the case where the data processing apparatus 100 processes 10 frames of the data during one operating time period is explained. But, the present invention is not limited to this case.

However, it is preferable that the number of frames to be processed during one operating time period be large, because an overhead process such as the clock control process and the power supply control process is required to transfer from an operating time period to a waiting time period or vice versa, and the load for performing the overhead process becomes significantly heavy when frequent transferring is necessary.

(Second Embodiment)

Figure 3:
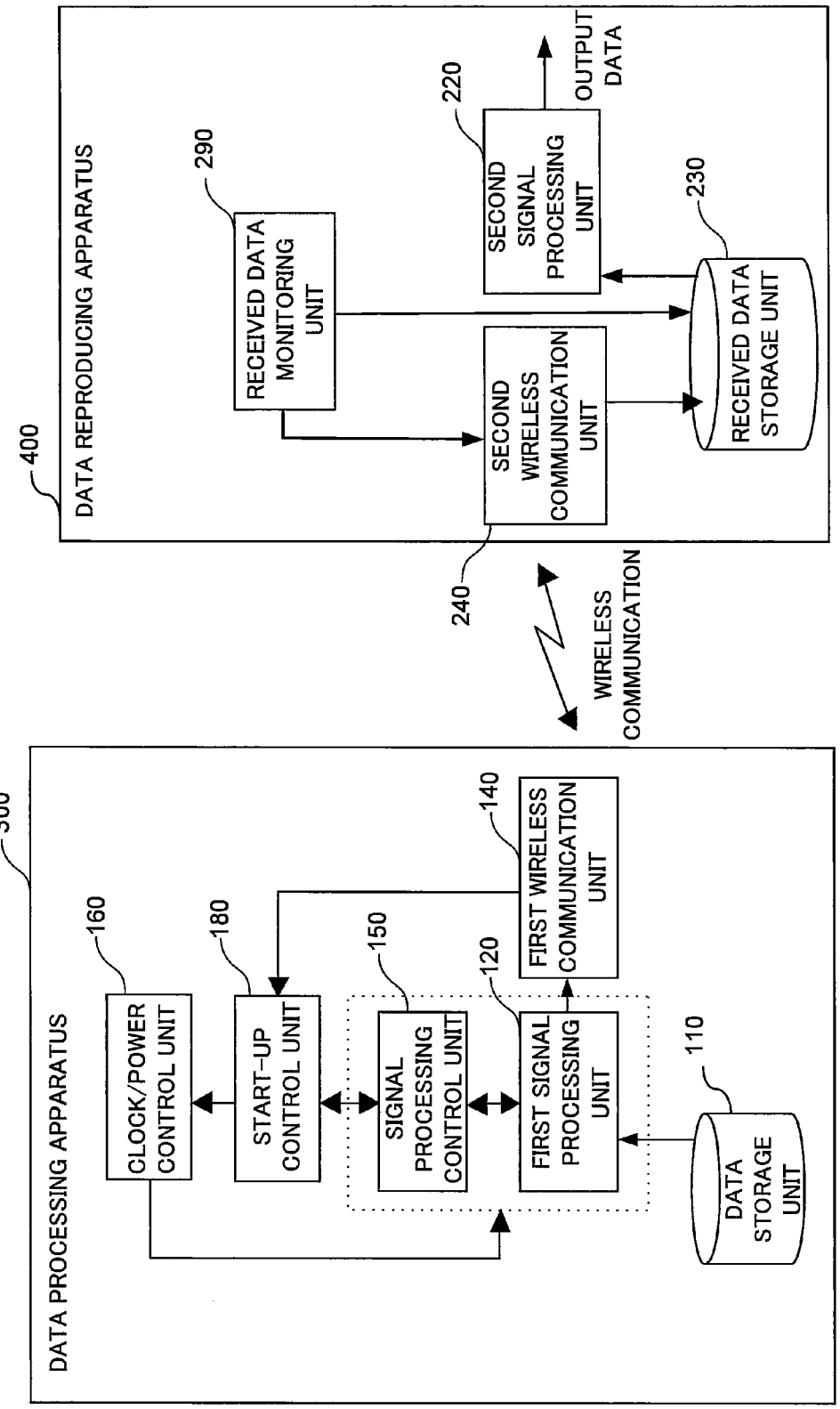
FIG. 3 is a block diagram of a data processing apparatus and a data reproducing apparatus according to a second embodiment of the present invention.

FIG. 3 shows a data processing apparatus and a data reproducing apparatus according the second embodiment of the present invention. Note that the same reference numerals as those of the first embodiment of the present invention are applied to the same constituent elements as those of the data processing apparatus 100 and the data reproducing apparatus 200 of the first embodiment.

As shown in FIG. 3, a data processing apparatus 300 comprises a data storage unit 110 for storing data, a first signal processing unit 120 for reading out and processing the data stored in the data storage unit 110, a first wireless communication unit 140 for wirelessly transmitting the data processed in the first signal processing unit 120 to a data reproducing apparatus 400, a signal processing control unit 150 for controlling the first signal processing unit 120 so as to work intermittently, a clock/power control unit 160 for controlling a supply of at least one of clock signals and power supplies to at least one part of the first signal processing unit 120 and the signal processing control unit 150, and a start-up control unit 180 for controlling the clock/power control unit 160.

Further, the data reproducing apparatus 400 comprises a second wireless communication unit 240 for receiving the data wirelessly transmitted from the first wireless communication unit 140, a received data storage unit 230 for temporarily storing the data received by the second wireless communication unit 240, a second signal processing unit 220 for real-time processing and outputting the data read out from the received data storage unit 230, and a received data monitoring unit 290 for monitoring the amount of data stored in the received data storage unit 230.

In this embodiment, the data processing apparatus 300 is a mobile phone, the data reproducing apparatus 400 is a stereo headphones for a wireless communication system such as Bluetooth, and the data reproducing apparatus 400 reproduces music data stored in the data processing apparatus 300 which is wirelessly transmitted to the data reproducing apparatus 300.

The data storage unit 110 is composed of a memory card. The data stored in the data storage unit 110 is compressed audio data encoded in AAC (Advanced Audio Coding).

The first signal processing unit 120 is comprised of a DSP (Digital Signal Processor), and works so as to decode the compressed data stored in the data storage unit 110 to corresponding PCM (Pulse Code Modulation) data by a software process of the DSP.

Further, the first signal processing unit 120 works so as to encode the PCM data to SBC (Sub-band Coding) data which can be reproduced by the data reproducing apparatus 400, and then to generate a plurality of packet data by performing a protocol process according to the communication protocol of the Bluetooth.

The first wireless communication unit 140 and the second wireless communication unit 240 work so as to send/receive the packet data by executing wireless communication compliant with the Bluetooth specifications.

And, the second wireless communication unit 240 works so as to send a data transmit request signal for requesting a transmission of packet data to the first wireless communication unit 140 with a command received from the received data monitoring unit 290.

The signal processing unit 150 is composed of a processor such as a microcomputer system to control each unit of the data processing apparatus 300, and works so as to control, for example, the first signal processing unit 120 to start or stop processing.

Especially, the signal processing control unit 150 works so as to control the first signal processing unit 120 so that the first signal processing unit 120 can work intermittently by processing data at a speed faster than the real-time processing.

For more detail, the signal processing control unit 150 works so as to indicate an amount of data to be processed to the first signal processing unit 120, and then request a halt command to the start-up control unit 180 after receiving information on completion of processing data of the indicated amount from the first signal processing unit 120. Thereafter, the signal processing control unit 150 works so as to indicate the amount of data to be processed to the first signal processing unit 120 again when receives a start-up command from the start-up control unit 180.

As a result, the first signal processing unit 120 intermittently works so that the active state where the data is being processed and the halt state where the data processing is halted are repeated alternately.

The start-up control unit 180 works so as to execute a halt control process to output a restriction request signal which requests the restriction of the supply of at least one of the clock signals and the power supplies supplied to at least one part of the first signal processing unit 120 and the signal processing control unit 150 to the clock/power control unit 160 in accordance with a halt request from the signal processing control unit 150. Where, the at least one part of the signal processing control unit 150 includes a part for controlling the first signal processing unit 120.

Further, the start-up control unit 180 works so as to execute a start-up control process to output a release request signal which requests the release of restricting output during the halt control process to the clock/power control unit 160 in accordance with the data transmit request signal received by the first wireless communication unit 140, and to force the signal processing unit 150 to transfer to an operating time period in the intermittent operation.

The clock/power control unit 160 works so as to reduce the power consumption of the data processing apparatus 300 by restricting the supply of at least one of the clock signals and the power supplies supplied to at least one part of the first signal processing unit 120 and the signal processing control unit 150 in accordance with the restriction request signal output from the start-up control unit 180. Further, the clock/power control unit 160 works so as to release the restriction in accordance with the release request signal output from the start-up control unit 180.

The clock/power control unit 160 works so as to control a clock generator, not shown, for generating the clock signals so that the clock generator performs any one of stopping the supply of the clock signals, lowering the frequency of the clock signals or lowering the amplitude of the clock signals, when restricting the supply of the clock signals to at least one part of the first signal processing unit 120 and the signal processing control unit 150.

The clock/power control unit 160 works so as to control a power supply circuit, not shown, for supplying the power supplies so that the power supply circuit performs any one of stopping the supply of the power supplies or lowering the voltage of the power supplies, when restricting the supply of the power supplies to at least one part of the first signal processing unit 120 and the signal processing control unit 150.

The received data storage unit 230 is comprised of a semiconductor memory and works so as to store the SBC data which is converted from the packet data received by the second wireless communication unit 240.

The second signal processing unit 220 works so as to read out the SBC data from the received data storage unit 230 in real-time processing, and output an analog audio signal which is converted from the PCM data decoded from the SBC data read out.

The received data monitoring unit 290 works so as to monitor the amount of data stored in the received data storage unit 230, and to order to send a data transmit request signal to the second wireless communication unit 240 when the amount of data stored in the received data storage unit 230 is lowered below a threshold amount.

Where, the threshold amount is preliminary determined so that the amount of data stored in the received data storage unit 230 which is read out in real-time processing by the second signal processing unit 220 does not reach to null.

The description for explaining the operation of the data processing apparatus 300 and the data reproducing apparatus 400 configured as above is omitted, because the operation is substantially the same as those described with reference to FIG. 2 for the data processing apparatus 100 and the data reproducing apparatus 200 according to the first embodiment of the present invention.

The data processing apparatus 300 according to the second embodiment of the present invention as above explained restricts at least one of the clock signals and the power supplies to at least one part of the first signal processing unit 120 and the signal processing control unit 150 during the waiting time period of the intermittent operation, thus the power consumption for processing the data of musical content and wirelessly transmitting the data to the data reproducing apparatus 200 can be reduced.

Further, the data processing apparatus 300 according to the second embodiment of the present invention can transmit the data to the data reproducing apparatus 400 in a more precise timing, because the data processing apparatus 300 performs a start-up process in response to the data transmit request signal sent from the data reproducing apparatus 400 in accordance with the order of the received data monitoring unit 290 for monitoring the amount of data stored in the received data storage unit 230.

In the above embodiment, the case where the data processing apparatus 300 is comprised of a mobile phone is explained. But the present invention is not limited to this case. The data processing apparatus 100 may be composed of a mobile audio-visual terminal such as a portable music player.

Further, in the above embodiment, the case where the first wireless communication unit 140 and the second wireless communication unit 240 execute wireless communication compliant with the Bluetooth specifications is explained. But the present invention is not limited to this case. The first wireless communication unit 140 and the second wireless communication unit 240 may execute wireless communication compliant with a wireless communication system which allows transmission of audio-visual data such as an infrared communication.

Moreover, in the above embodiment, the case where the data storage unit 110 is composed of a memory card is explained. But the present invention is not limited to this case. The data storage unit 110 may be composed of a storage medium capable of storing audio-visual data such as a magnetic tape, a magnetic disk, a semiconductor memory, or a hard disk.

Further, in the above embodiment, the case where the data stored in the data storage unit 110 is the compressed audio data encoded in AAC is explained. But the present invention is not limited to this case. The data stored in the data storage unit 110 may be compressed data of digital audio data such as MP3 (MPEG Audio Layer-3) data.

Moreover, the data stored in the data storage unit 110 may be moving image data such as MPEG-4 video data or still image data such as JPEG (Joint Photographic Experts Group).

Additionally, the data stored in the data storage unit 110 may be a cryptograph encrypted in the DES (Data Encryption Standard) or the AES (Advanced Encryption Standard). In this case, the first signal processing unit 120 is configured so as to further perform an encryption decoding process.

Moreover, in the above embodiment, the case where the first signal processing unit 120 performs the decoding process of AAC, the SBC process, and the protocol process is explained. But the present invention is not limited to this case. The first signal processing unit 120 may perform a part of the above processes, so long as the data reproducing apparatus 400 can reproduce the data.

Additionally, in the above embodiment, the case where the second signal processing unit 220 performs the converting process to analog signals is explained. But, the present invention is not limited to this case. The second signal processing unit 220 may not perform the converting process to analog signals when the output unit of the second signal processing unit 220 is a unit which requires inputting digital data such as a liquid crystal display panel.

Further, in the above embodiment, the case where the first signal processing unit 120 performs the transcoding process from the AAC data to the SBC data is explained. But, the present invention is not limited to this case. The first signal processing unit 120 may perform following processes;

a frequency converting process for converting the sampling frequency of original data so that the data reproducing apparatus 400 can reproduce the frequency converted data when the apparatus does not accept the sampling frequency of the original data, a spatial resolution converting process for converting the spatial resolution of original data so that the data reproducing apparatus 400 can reproduce the spatial resolution converted data when the apparatus does not accept the spatial resolution of the original data, a frame rate converting process for converting the frame rate of original data so that the data reproducing apparatus 400 can reproduce the frame rate converted data when the apparatus does not accept the frame rate of the original data, and a format converting process for converting the format of original data so that the data reproducing apparatus 400 can reproduce the format converted data when the apparatus does not accept the format of the original data.

Moreover, in the above embodiment, the case where the first signal processing unit 120 is composed of a DSP is explained. But, the present invention is not limited to this case. The first signal processing unit 120 may be composed of another type of processors such as a CPU (Central Processing Unit), or partially or wholly by hardware.

Further, in the above embodiment, the case where the data processing apparatus 300 processes 10 frames of the data during one operating time period is explained. But, the present invention is not limited to this case.

However, it is preferable that the number of frames to be processed during one operating time period be large, because an overhead process such as the clock control process and the power supply control process is required to transfer from an operating time period to a waiting time period or vice versa, and the load for performing the overhead process becomes significantly heavy when frequent transferring is necessary.

(Third Embodiment)

Figure 4:
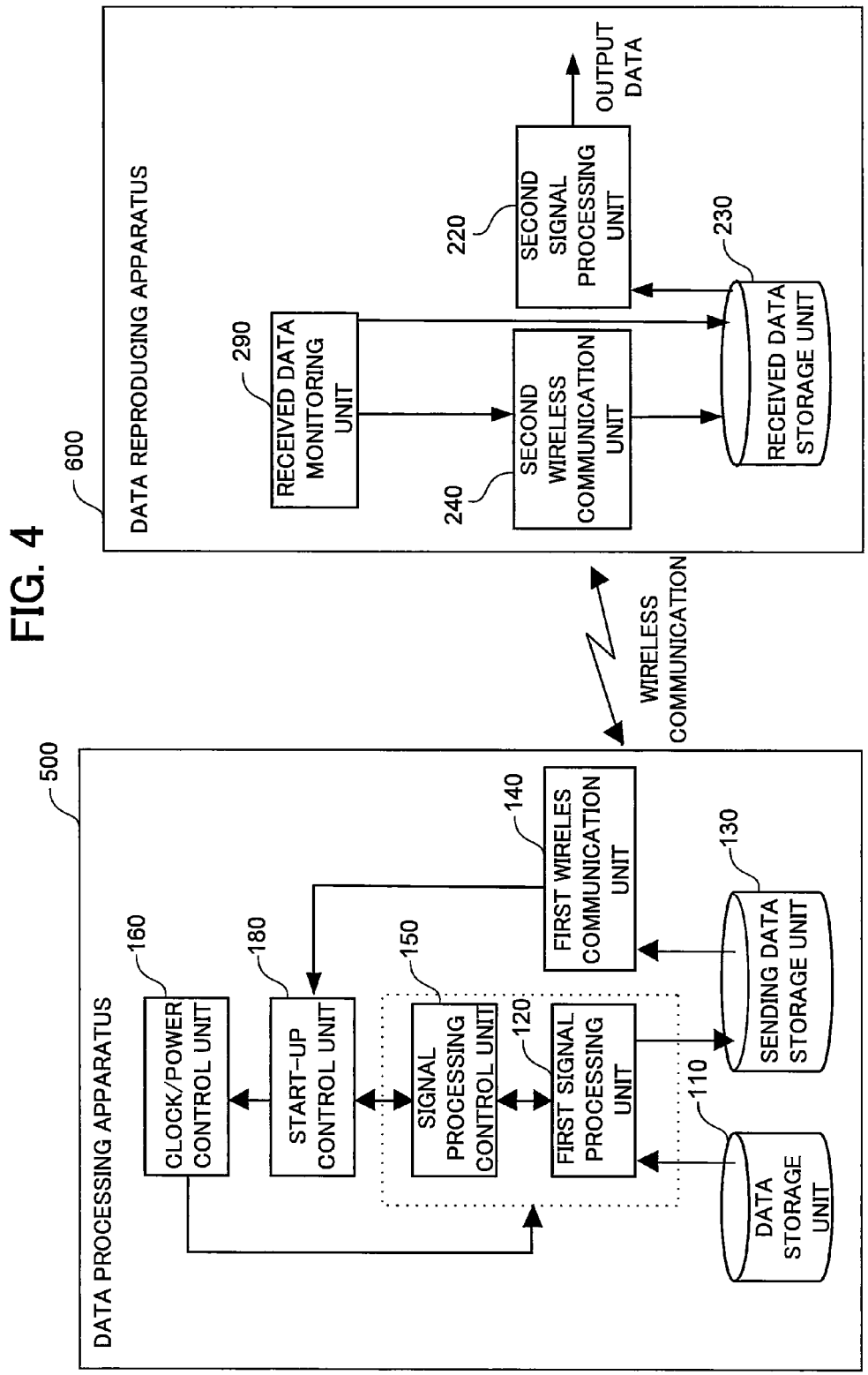
FIG. 4 is a block diagram of a data processing apparatus and a data reproducing apparatus according to a third embodiment of the present invention.

FIG. 4 shows a data processing apparatus and a data reproducing apparatus according the third embodiment of the present invention. Note that the same reference numerals as those of the second embodiment of the present invention are applied to the same constituent elements as those of the data processing apparatus 300 and the data reproducing apparatus 400 of the second embodiment.

As shown in FIG. 4, a data processing apparatus 500 comprises a data storage unit 110 for storing data, a first signal processing unit 120 for reading out and processing the data stored in the data storage unit 110, a sending data storage unit 130 for temporarily storing the data processed in the first signal processing unit 120, a first wireless communication unit 140 for wirelessly transmitting the data stored in the sending data storage unit 130 to a data reproducing apparatus 600, a signal processing control unit 150 for controlling the first signal processing unit 120 so as to work intermittently, a clock/power control unit 160 for controlling a supply of at least one of clock signals and power supplies to at least one part of the first signal processing unit 120 and the signal processing control unit 150, and a start-up control unit 180 for controlling the clock/power control unit 160.

Further, the data reproducing apparatus 600 comprises a second wireless communication unit 240 for receiving the data wirelessly transmitted from the first wireless communication unit 140, a received data storage unit 230 for temporarily storing the data received by the second wireless communication unit 240, a second signal processing unit 220 for real-time processing and outputting the data read out from the received data storage unit 230, and a received data monitoring unit 290 for monitoring the amount of data stored in the received data storage unit 230.

In this embodiment, the data processing apparatus 500 is a mobile phone, the data reproducing apparatus 600 is a stereo headphones for a wireless communication system such as Bluetooth, and the data reproducing apparatus 600 reproduces music data stored in the data processing apparatus 500 which is wirelessly transmitted to the data reproducing apparatus 600.

The data storage unit 110 is composed of a memory card. The data stored in the data storage unit 110 is compressed audio data encoded in AAC (Advanced Audio Coding).

The first signal processing unit 120 is comprised of a DSP (Digital Signal Processor), and works so as to decode the compressed data stored in the data storage unit 110 to corresponding PCM (Pulse Code Modulation) data by a software process of the DSP.

Further, the first signal processing unit 120 works so as to encode the PCM data to SBC (Sub-band Coding) data which can be reproduced by the data reproducing apparatus 600, and then to generate a plurality of packet data by performing a protocol process according to the communication protocol of the Bluetooth.

The first wireless communication unit 140 and the second wireless communication unit 240 work so as to send/receive the packet data by executing wireless communication compliant with the Bluetooth specifications.

Where, the first wireless communication unit 140 works so as to wirelessly transmit the data stored in the sending data storage unit 130 while the first signal processing unit 120 is performing the data processing.

And, the second wireless communication unit 240 works so as to send a data transmit request signal for requesting a transmission of packet data to the first wireless communication unit 140 with a command received from the received data monitoring unit 290.

The signal processing unit 150 is composed of a processor such as a microcomputer system to control each unit of the data processing apparatus 300, and works so as to control, for example, the first signal processing unit 120 to start or stop processing.

Especially, the signal processing control unit 150 works so as to control the first signal processing unit 120 so that the first signal processing unit 120 can work intermittently by processing data at a speed faster than the real-time processing.

For more detail, the signal processing control unit 150 works so as to indicate an amount of data to be processed to the first signal processing unit 120, and then to request a halt command to the start-up control unit 180 after receiving information on completion of processing data of the indicated amount from the first signal processing unit 120. Thereafter, the signal processing control unit 150 works so as to indicate the amount of data to be processed to the first signal processing unit 120 again when receives a start-up command from the start-up control unit 180.

As a result, the first signal processing unit 120 intermittently works so that the active state where the data is being processed and the halt state where the data processing is halted are repeated alternatively.

The start-up control unit 180 works so as to execute a halt control process to output a restriction request signal which restricts the supply of at least one of the clock signals and the power supplies supplied to at least one part of the first signal processing unit 120 and the signal processing control unit 150. Where, the at least one part of the signal processing control unit 150 includes a part for controlling the first signal processing unit 120.

Further, the start-up control unit 180 works so as to execute a start-up control process to output a release request signal which requests the release of restricting output during the halt control process to the clock/power control unit 160 in accordance with the data transmit request signal received by the first wireless communication unit 140, and to force the signal processing unit 150 to transfer to an operating time period in the intermittent operation.

The clock/power control unit 160 works so as to reduce the power consumption of the data processing apparatus 500 by restricting the supply of at least one of the clock signals and the power supplies supplied to at least one part of the first signal processing unit 120 and the signal processing control unit 150 in accordance with the restriction request signal output from the start-up control unit 180. Further, the clock/power control unit 160 works so as to release the restriction in accordance with the release request signal output from the start-up control unit 180.

The clock/power control unit 160 works so as to control a clock generator, not shown, for generating the clock signals so that the clock generator performs any one of stopping the supply of the clock signals, lowering the frequency of the clock signals or lowering the amplitude of the clock signals, when restricting the supply of the clock signals to at least one part of the first signal processing unit 120 and the signal processing control unit 150.

The clock/power control unit 160 works so as to control a power supply circuit, not shown, for supplying the power supplies so that the power supply circuit performs any one of stopping the supply of the power supplies or lowering the voltage of the power supplies, when restricting the supply of the power supplies to at least one part of the first signal processing unit 120 and the signal processing control unit 150.

The received data storage unit 230 is comprised of a semiconductor memory and works so as to store the SBC data which is converted from the packet data received by the second wireless communication unit 240.

The second signal processing unit 220 works so as to read out the SBC data from the received data storage unit 230 in real-time processing, and output an analog audio signal which is converted from the PCM data decoded from the SBC data read out.

The received data monitoring unit 290 works so as to monitor the amount of data stored in the received data storage unit 230, and to order to send a data transmit request signal to the second wireless communication unit 240 when the amount of data stored in the received data storage unit 230 is lowered below a threshold amount.

Where, the threshold amount is preliminary determined so that the amount of data stored in the received data storage unit 230 which is read out in real-time processing by the second signal processing unit 220 does not reach to null.

Figure 5:
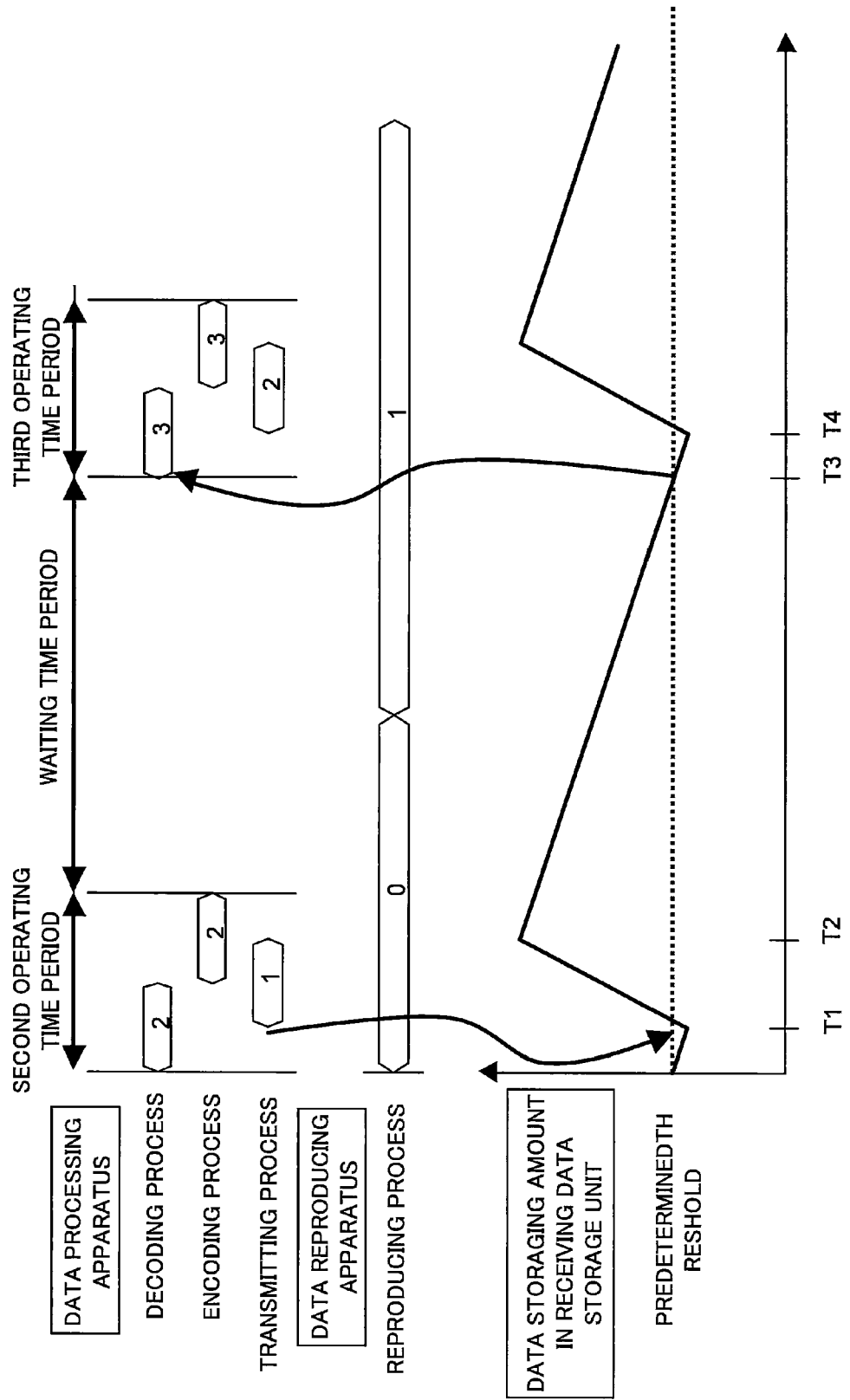
FIG. 5 is a timing chart of the data processing apparatus and the data reproducing apparatus according to the third embodiment of the present invention.

Hereafter, the behavior of the data processing apparatus 500 and the data reproducing apparatus 600 thus constructed as above will be explained with referring to FIG. 5. Where, the data processing apparatus 500 and the data reproducing apparatus 600 process data in a unit of frame which is a processing unit of the AAC data and the SBC data.

In the second operating time period, the data processing apparatus 500 continuously performs a decoding process of a predetermined number of frames (for example, 10 frames) of the AAC data. The data processing apparatus 500 then performs an SBC process for encoding the decoded data to the SBC data, a protocol process for converting the SBC data into packet data, and storing process for storing the packet data in the sending data storage unit 130.

The data processing apparatus 500 performs the wireless transmitting process to wirelessly transmit the packet data stored in the sending data storage unit 130 to the data reproducing apparatus 600 while performing the above processes.

Note, in the wireless transmitting process, the data processing apparatus 500 wirelessly transmits the packet data which has been processed in the first signal processing unit 120 and stored in the sending data storage unit 130 during the previous operating time period.

For example, in the third operating time period, the packet data stored in the sending data storage unit 130 during the second operating time period is transmitted.

When the wireless transmitting process and the processes of the first signal processing unit 120 are completed, the data processing apparatus 500 is transferred into a waiting time period of the intermittent operation.

In the waiting time period, the data processing apparatus 500 goes into a power saving state where the supply of the clock signal and the power supplies to at least one part of the first signal processing unit 120 and the signal processing control unit 150 is stopped.

On the other hand, the data reproducing apparatus 600 continuously performs a reproducing process in real-time processing comprised of a decoding process for decoding the SBC data obtained from the packet data received from the data processing apparatus 600 and a converting process for converting the PCM data decoded from the SBC data into an analog signal.

Therefore, the SBC data stored in the received data storage unit 230 is read out as needed and consumed by the second signal processing unit 220.

As a result, the amount of data stored in the received data storage unit 230 is rapidly increased, because the data, the amount thereof is more than that of the data processed in the second signal processing unit 220, are transmitted from the data processing apparatus 100 between the time T1 and the time T2.

On the other hand, the amount of data stored in the received data storage unit 230 decreases after the time T2 because the transmission of data from the data processing apparatus 500 is halted, and the second signal processing unit 220 continuously reads out the data stored in the received data storage unit 230.

When the timing of the time T3 at which the amount of data stored in the received data storage unit 230 becomes less than a threshold amount and the data transmit request signal is transmitted from the data reproducing apparatus 600 to the data processing apparatus 500, the data processing apparatus 500 resumes processing data and starts transmitting the processed data again at the time T4.

Where, the threshold amount for the amount of data stored in the received data storage unit 230 is determined so that the amount of data stored in the received data storage unit 230 does not reach to null at the time T4.

The data processing apparatus 500 and the data reproducing apparatus 600 work as above-explained, thus continuous data reproducing is achieved without drying out the data stored in the received data storage unit 230.

For example, the reproducing time for reproducing 10 frames of the data sampled at a 48 kHz sampling frequency is about 200 milliseconds, and continuous data reproducing will be achieved if the data processing apparatus 500 can finish the data processing within this 200 milliseconds.

When the first signal processing unit 120 can decode the data 10 times faster than normal, the data included in 10 frames will be processed in 20 milliseconds.

Further, if the data processing apparatus 500 can complete each of the SBC process and the wireless transmitting process in 10 milliseconds, the apparatus can complete all processes from the decoding process to the wireless transmitting process in a total of 30 milliseconds, because the wireless transmitting process is performed in parallel with the decoding process and the encoding process.

Therefore, if the apparatus can complete the process in 30 milliseconds during this 200 milliseconds time period, an 85% of 200 milliseconds becomes a waiting time period.

The data processing apparatus 500 according to the third embodiment of the present invention as above explained restricts at least one of the clock signals and the power supplies to at least one part of the first signal processing unit 120 and the signal processing control unit 150 during the waiting time period of the intermittent operation, thus the power consumption for processing the data of musical content and wirelessly transmitting the data to the data reproducing apparatus 600 can be reduced.

Further, the data processing apparatus 500 according to the third embodiment of the present invention can transmit the data to the data reproducing apparatus 600 in a more precise timing, because the data processing apparatus 500 performs a start-up process in response to the data transmit request signal sent from the data reproducing apparatus 600 in accordance with the order of the received data monitoring unit 290 for monitoring the amount of data stored in the received data storage unit 230.

Additionally the data processing apparatus 500 according to the third embodiment of the present invention achieves the waiting time period of the intermittent operation longer than the preceding embodiments, because the wireless transmitting process transmitting the packet data to the data reproducing apparatus 600 is performed in parallel with the decoding process and the encoding process.

In the above embodiment, the case where the data processing apparatus 500 is comprised of a mobile phone is explained. But the present invention is not limited to this case. The data processing apparatus 500 may be composed of a mobile audio-visual terminal such as a portable music player.

Further, in the above embodiment, the case where the first wireless communication unit 140 and the second wireless communication unit 240 execute wireless communication compliant with the Bluetooth specifications is explained. But the present invention is not limited to this case. The first wireless communication unit 140 and the second wireless communication unit 240 may execute wireless communication compliant with a wireless communication system which allows transmission of audio-visual data such as an infrared communication.

Moreover, in the above embodiment, the case where the data storage unit 110 is composed of a memory card is explained. But the present invention is not limited to this case. The data storage unit 110 may be composed of a storage medium capable of storing audio-visual data such as a magnetic tape, a magnetic disk, a semiconductor memory, or a hard disk.

Further, in the above embodiment, the case where the data stored in the data storage unit 110 is the compressed audio data encoded in AAC is explained. But the present invention is not limited to this case. The data stored in the data storage unit 110 may be compressed data of digital audio data such as MP3 (MPEG Audio Layer-3) data.

Further, the data stored in the data storage unit 110 may be moving image data such as MPEG-4 video data or still image data such as JPEG (Joint Photographic Experts Group).

Additionally, the data stored in the data storage unit 110 may be a cryptograph encrypted in the DES (Data Encryption Standard) or the AES (Advanced Encryption Standard). In this case, the first signal processing unit 120 is configured so as to further perform an encryption decoding process.

Moreover, in the above embodiment, the case where the first signal processing unit 120 performs the decoding process of AAC, the SBC process, and the protocol process is explained. But the present invention is not limited to this case. The first signal processing unit 120 may perform a part of the above processes, so long as the data reproducing apparatus 600 can reproduce the data.

Additionally, in the above embodiment, the case where the second signal processing unit 220 performs the converting process to analog signals is explained. But, the present invention is not limited to this case. The second signal processing unit 220 may not perform the converting process to analog signals when the output unit of the second signal processing unit 220 is a unit which requires inputting digital data such as a liquid crystal display panel.

Further, in the above embodiment, the case where the first signal processing unit 120 performs the transcoding process from the AAC data to the SBC data is explained. But, the present invention is not limited to this case. The first signal processing unit 120 may perform following processes; a frequency converting process for converting the sampling frequency of original data so that the data reproducing apparatus 600 can reproduce the frequency converted data when the apparatus does not accept the sampling frequency of the original data, a spatial resolution converting process for converting the spatial resolution of original data so that the data reproducing apparatus 600 can reproduce the spatial resolution converted data when the apparatus does not accept the spatial resolution of the original data, a frame rate converting process for converting the frame rate of original data so that the data reproducing apparatus 600 can reproduce the frame rate converted data when the apparatus does not accept the frame rate of the original data, and a format converting process for converting the format of original data so that the data reproducing apparatus 600 can reproduce the format converted data when the apparatus does not accept the format of the original data.

Moreover, in the above embodiment, the case where the first signal processing unit 120 is composed of a DSP is explained. But, the present invention is not limited to this case. The first signal processing unit 120 may be composed of another type of processors such as a CPU (Central Processing Unit), or partially or wholly by hardware.

Further, in the above embodiment, the case where the data processing apparatus 500 processes 10 frames of the data during one operating time period is explained. But, the present invention is not limited to this case.

However, it is preferable that the number of frames to be processed during one operating time period be large, because an overhead process such as the clock control process and the power supply control process is required to transfer from an operating time period to a waiting time period or vice versa, and the load for performing the overhead process becomes significantly heavy when frequent transferring is necessary.

Additionally, in this embodiment, the case where the start-up control unit 180 performs the start-up control process in response to the data transmit request signal sent from the data reproducing apparatus 600 is explained. The data processing apparatus 500 of this embodiment, however, may comprise the trigger signal generating unit 170 as the same as that of the data processing apparatus 100 of the first embodiment, and may make the start-up control unit 180 to perform the start-up control process in response to the trigger signal generated in the trigger signal generating unit 170.

(Fourth Embodiment)

Figure 6:
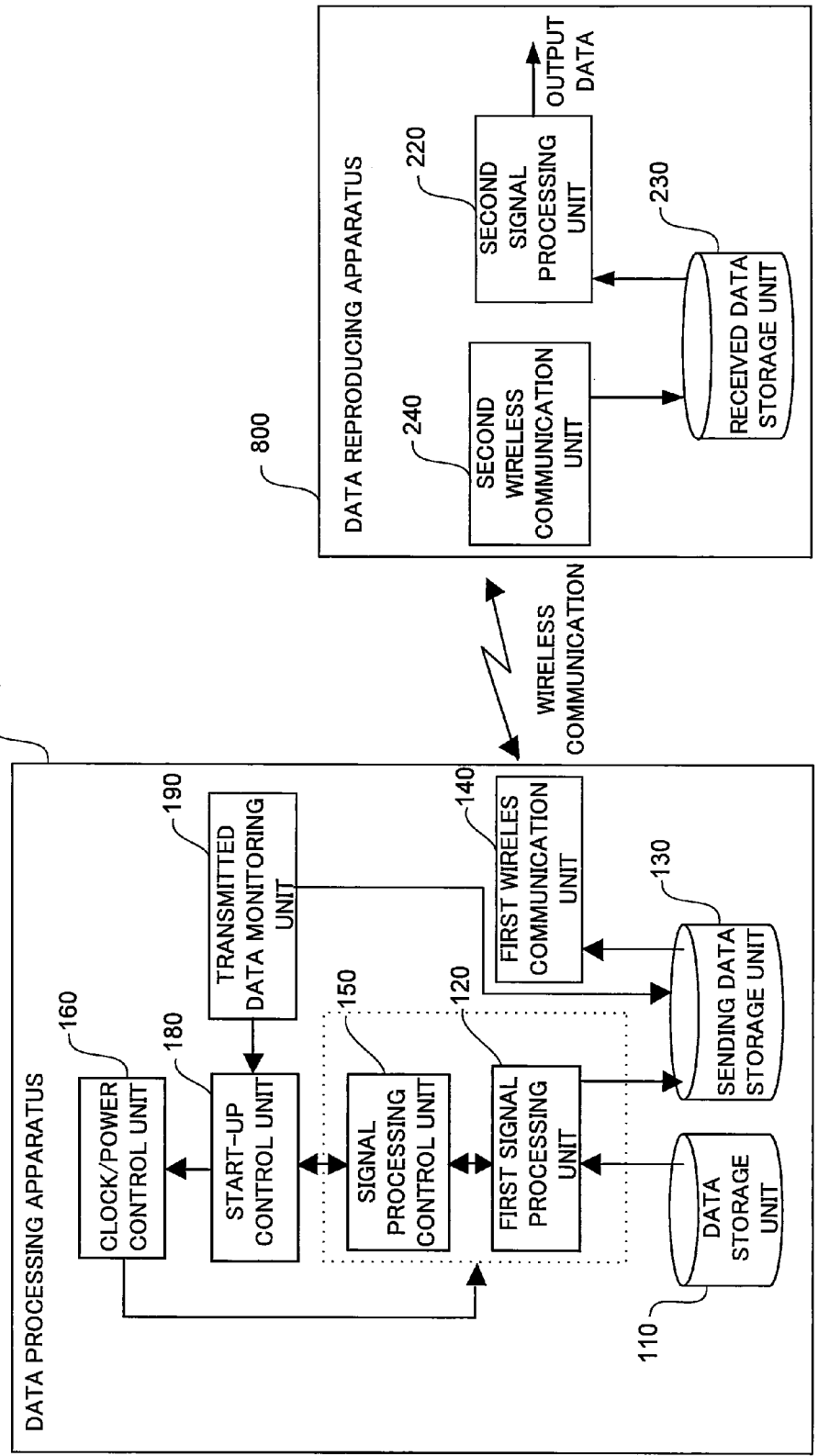
FIG. 6 is a block diagram of a data processing apparatus and a data reproducing apparatus according to a fourth embodiment of the present invention.

FIG. 6 shows a data processing apparatus and a data reproducing apparatus according the fourth embodiment of the present invention. Note that the same reference numerals as those of the first embodiment of the present invention are applied to the same constituent elements as those of the data processing apparatus 100 and the data reproducing apparatus 200 of the first embodiment.

As shown in FIG. 6, a data processing apparatus 700 comprises a data storage unit 110 for storing data, a first signal processing unit 120 for reading out and processing the data stored in the data storage unit 110, a sending data storage unit 130 for temporarily storing the data processed in the first signal processing unit 120, a first wireless communication unit 140 for wirelessly transmitting the data stored in the sending data storage unit 130 to a data reproducing apparatus 800, a signal processing control unit 150 for controlling the first signal processing unit 120 so as to work intermittently, a clock/power control unit 160 for controlling a supply of at least one of clock signals and power supplies to at least one part of the first signal processing unit 120 and the signal processing control unit 150, a start-up control unit 180 for controlling the clock/power control unit 160, and a transmitted data monitoring unit 190 for monitoring an amount of data stored in the sending data storage unit 130.

Further, the data reproducing apparatus 800 comprises a second wireless communication unit 240 for receiving the data wirelessly transmitted from the first wireless communication unit 140, a received data storage unit 230 for temporarily storing the data received by the second wireless communication unit 240, and a second signal processing unit 220 for real-time processing and outputting the data read out from the received data storage unit 230.

In this embodiment, the data processing apparatus 700 is a mobile phone, the data reproducing apparatus 800 is a stereo headphones for a wireless communication system such as Bluetooth, and the data reproducing apparatus 800 reproduces music data stored in the data processing apparatus 700 which is wirelessly transmitted to the data reproducing apparatus 700.

The data storage unit 110 is composed of a memory card. The data stored in the data storage unit 110 is compressed audio data encoded in AAC (Advanced Audio Coding).

The first signal processing unit 120 is comprised of a DSP (Digital Signal Processor), and works so as to decode the compressed data stored in the data storage unit 110 to corresponding PCM (Pulse Code Modulation) data by a software process of the DSP.

Further, the first signal processing unit 120 works so as to encode the PCM data to SBC (Sub-band Coding) data which can be reproduced by the data reproducing apparatus 800, and then to generate a plurality of packet data by performing a protocol process according to the communication protocol of the Bluetooth.

The first wireless communication unit 140 and the second wireless communication unit 240 work so as to send/receive the packet data by executing wireless communication compliant with the Bluetooth specifications.

Where, the first wireless communication unit 140 reads out and transmits the processed packet data stored in the sending data storage unit 130 in real-time independently from the signal processing processed by the first signal processing unit 120.

The signal processing unit 150 is composed of a processor such as a microcomputer system to control each unit of the data processing apparatus 700, and works so as to control, for example, the first signal processing unit 120 to start or stop processing.

Especially, the signal processing control unit 150 works so as to control the first signal processing unit 120 so that the first signal processing unit 120 can work intermittently by processing data at a speed faster than the real-time processing.

For more detail, the signal processing control unit 150 works so as to indicate an amount of data to be processed to the first signal processing unit 120, and then to request a halt command to the start-up control unit 180 after receiving information on completion of processing data of the indicated amount from the first signal processing unit 120. Thereafter, the signal processing control unit 150 works so as to indicate the amount of data to be processed to the first signal processing unit 120 again when receives start-up command from the start-up control unit 180.

As a result, the first signal processing unit 120 intermittently works so that the active state where the data is being processed and the halt state where the data processing is halted are repeated alternatively.

The transmitted data monitoring unit 190 works so as to monitor the amount of data stored in the sending data storage unit 130, and output a data processing request signal to the start-up control unit 180, when the amount of data stored in the sending data storage unit 130 is lowered below a threshold amount.

Where, the threshold amount is preliminary determined so that the amount of data stored in the sending data storage unit 130 which is read out in real-time processing by the first wireless communication unit 140 does not reach to null.

While the first wireless communication unit 140 reads out the data stored in the sending data storage unit 130 in real-time processing, the second signal processing unit 220 reads out the data stored in the received data storage unit 230 in real-time. Therefore, by determining the threshold amount of data stored in the sending data storage unit 130 so as not to reach null, the amount of data stored in the received data storage unit 230 is prevented from reaching to null.

The start-up control unit 180 works so as to execute a halt control process to output a restriction request signal which restricts the supply of at least one of the clock signal sand the power supplies supplied to at least one part of the first signal processing unit 120 and the signal processing control unit 150.

Where, the at least one part of the signal processing control unit 150 includes a part for controlling the first signal processing unit 120.

Further, the start-up control unit 180 works so as to execute a start-up control process to output a release request signal which requests the release of restricting output during the halt control process to the clock/power control unit 160 in accordance with the data processing request signal generated by the transmitted data monitoring unit 190, and to force the signal processing unit 150 to transfer to an operating time period in the intermittent operation.

The clock/power control unit 160 works so as to reduce the power consumption of the data processing apparatus 700 by restricting the supply of at least one of the clock signals and the power supplies supplied to at least one part of the first signal processing unit 120 and the signal processing control unit 150 in accordance with the restriction request signal output from the start-up control unit 180. Further, the clock/power control unit 160 works so as to release the restriction in accordance with the release request signal output from the start-up control unit 180.

The clock/power control unit 160 works so as to control a clock generator, not shown, for generating the clock signals so that the clock generator performs any one of stopping the supply of the clock signals, lowering the frequency of the clock signals or lowering the amplitude of the clock signals, when restricting supply of the clock signals to at least one part of the first signal processing unit 120 and the signal processing control unit 150.

The clock/power control unit 160 works so as to control a power supply circuit, not shown, for supplying the power supplies so that the power supply circuit performs any one of stopping the supply of the power supplies or lowering the voltage of the power supplies, when restricting the supply of the power supplies to at least one part of the first signal processing unit 120 and the signal processing control unit 150.

The received data storage unit 230 is comprised of a semiconductor memory and works so as to store the SBC data which is converted from the packet data received by the second wireless communication unit 240.

The second signal processing unit 220 works so as to read out the SBC data from the received data storage unit 230 in real-time processing, and output an analog audio signal which is converted from the PCM data decoded from the SBC data read out.

Figure 7:
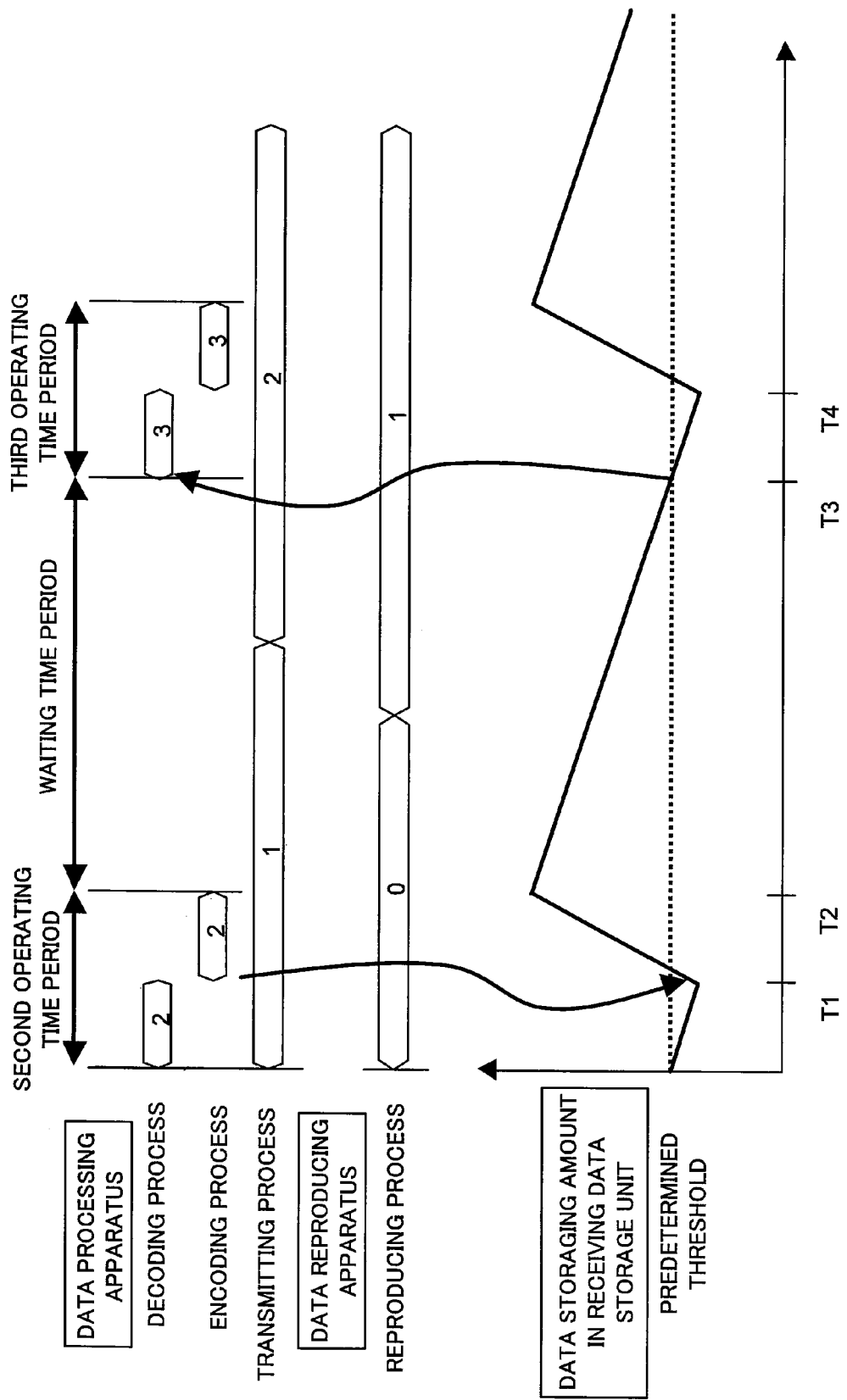
FIG. 7 is a timing chart of the data processing apparatus and the data reproducing apparatus according to the fourth embodiment of the present invention.
Figure 8:
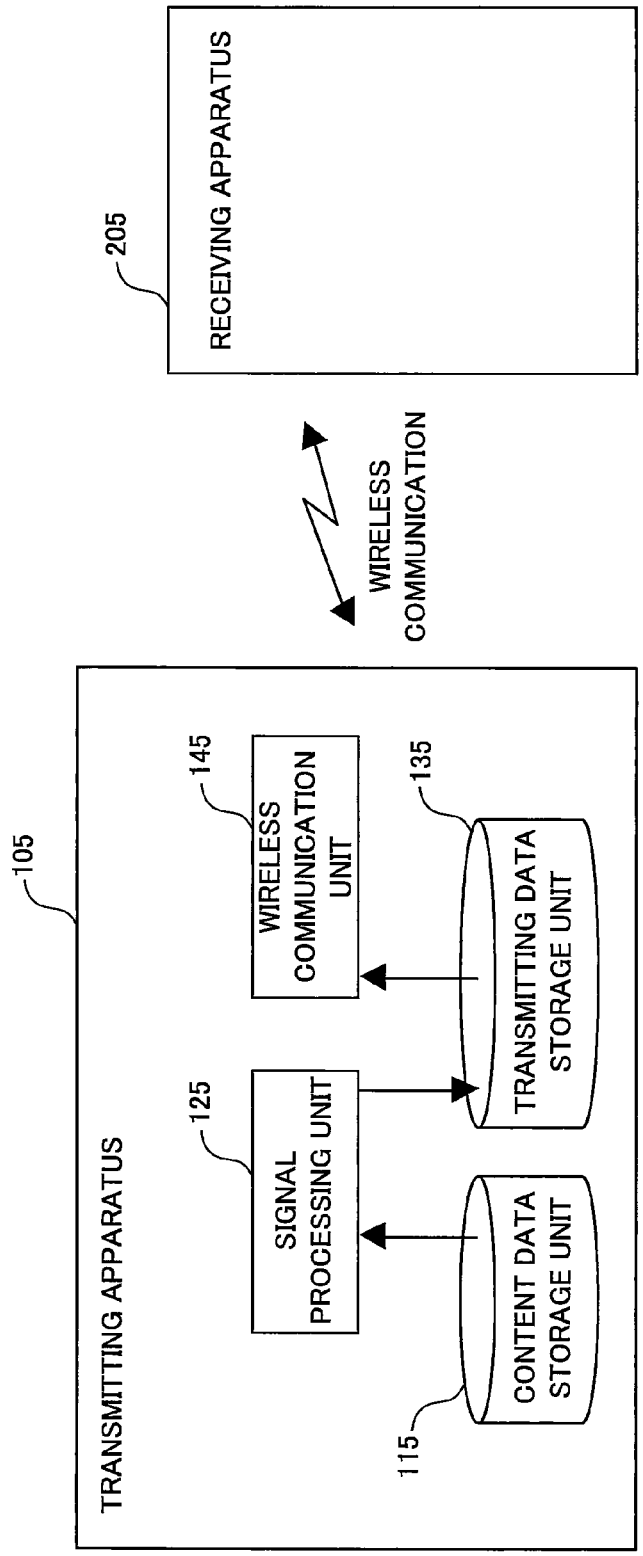
FIG. 8 is a block diagram of a conventional data processing apparatus and a data receiving apparatus.
Figure 9:
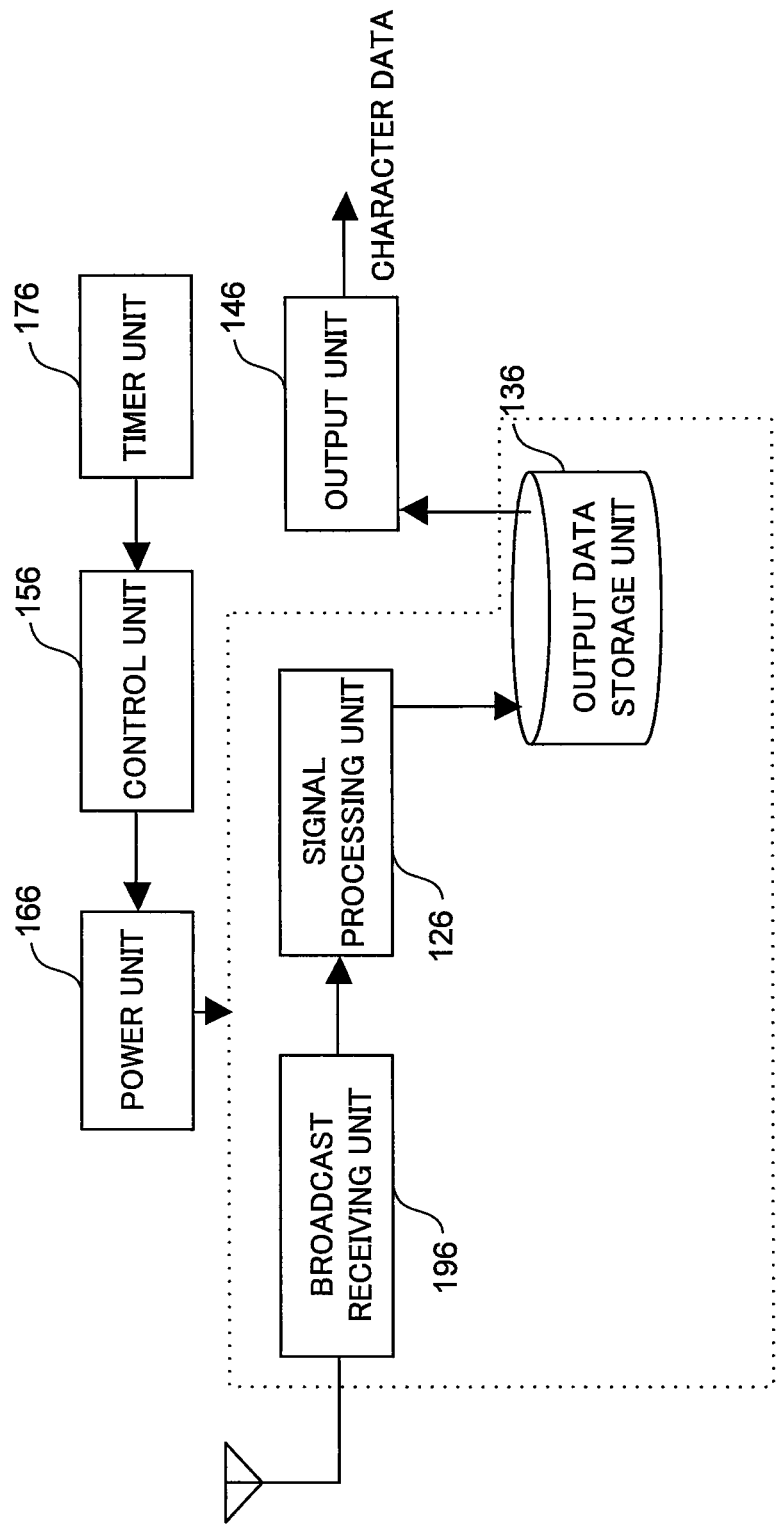
FIG. 9 is a block diagram of another conventional data processing apparatus.

Hereafter, the behavior of the data processing apparatus 700 and the data reproducing apparatus 800 thus constructed as above will be explained with referring to FIG. 7. Where, the data processing apparatus 700 and the data reproducing apparatus 800 process data in a unit of frame which is a processing unit of the AAC data and the SBC data.

In the second operating time period, the data processing apparatus 700 continuously performs a decoding process of a predetermined number of frames (for example, 10 frames) of the AAC data. The data processing apparatus 700 then performs an SBC process for encoding the decoded data to the SBC data, a protocol process for converting the SBC data into packet data, and storing process for storing the packet data in the sending data storage unit 130.

When the process of the first signal processing unit 120 is completed, the data processing apparatus 700 is transferred into a waiting time period of the intermittent operation.

In the waiting time period, the data processing apparatus 700 goes into a power saving state where the supply of the clock signals and the power supplies to at least one part of the first signal processing unit 120 and the signal processing control unit 150 is stopped.

The wireless transmitting process for transmitting the data stored in the sending data storage unit 130 to the data reproducing apparatus 800 is independently performed in parallel with the process of the first signal processing unit 120. In this transmitting process, the packet data processed by the signal processing unit 120 and stored in the sending data storage unit 130 during the previous operating time period is read out and transmitted in real-time processing.

On the other hand, the data reproducing apparatus 800 continuously performs a reproducing process in real-time processing comprised of a decoding process for decoding the SBC data obtained from the packet data from the data processing apparatus 700 and a converting process for converting the PCM data decoded from the SBC data into an analog signal.

Therefore, the SBC data stored in the received data storage unit 230 is read out as needed and consumed by the second signal processing unit 220.

As a result, the amount of data stored in the sending data storage unit 130 is rapidly increased, because the data, the amount thereof is more than that of the data processed in the first wireless communication unit 140, are sent to the sending data storage unit 130 by the first signal processing unit 120 between the time T1 and the time T2.

On the other hand, the amount of data stored in the sending data storage unit 130 decreases after the time T2 because the signal processing by the first signal processing unit 120 is halted, and the first signal processing unit 140 continuously reads out the data stored in the sending data storage unit 130.

When the amount of data stored in the sending data storage unit 130 becomes less than a threshold amount at the time T3, and the transmitted data monitoring unit 190 outputs a data processing request signal to the start-up control unit 180, the first signal processing unit 120 of the data processing apparatus 700 starts processing data again. Where, the threshold amount for the amount of data stored in the sending data storage unit 130 is determined so that the amount of data stored in the sending data storage unit 130 does not reach to null at the time T4.

The data processing apparatus 700 and the data reproducing apparatus 800 work as above-explained, thus continuous data reproducing is achieved without drying out the data stored in the received data storage unit 230.

For example, the reproducing time for reproducing 10 frames of the data sampled at a 48 kHz sampling frequency is about 200 milliseconds, and continuous data reproducing will be achieved if the data processing apparatus 700 can finish the data processing within this 200 milliseconds. When the first signal processing unit 120 can decode the data 10 times faster than normal, the data included in 10 frames will be processed in 20 milliseconds.

Further, if the data processing apparatus 700 can complete each of the SBC process and the wireless transmitting process in 10 milliseconds, the apparatus can complete all processes from the decoding process to the wireless transmitting process in a total of 30 milliseconds, because the wireless transmitting process is performed in parallel with the decoding process and the encoding process.

Therefore, if the apparatus can complete the process in 30 milliseconds during this 200 milliseconds time period, an 85% of 200 milliseconds becomes a waiting time period.

The data processing apparatus 700 according to the forth embodiment of the present invention as above explained restricts at least one of the clock signals and the power supplies to at least one part of the first signal processing unit 120 and the signal processing control unit 150 during the waiting time period of the intermittent operation, thus the power consumption for processing the data of musical content and wirelessly transmitting the data to the data reproducing apparatus 800 can be reduced.

Further, the data processing apparatus 700 according to the forth embodiment of the present invention can transmit the data to the data reproducing apparatus 800 in a more precise timing, because the data processing apparatus 700 performs a start-up process in response to the data transmit request signal sent from the transmitted data monitoring unit 190 for monitoring the amount of data stored in the sending data storage unit 130.

Additionally the data processing apparatus 700 according to the forth embodiment of the present invention achieves the waiting time period of the intermittent operation longer than the preceding embodiments, because the wireless transmitting process transmitting the packet data to the data reproducing apparatus is independently performed in parallel with the decoding process and the encoding process.

In the above embodiment, the case where the data processing apparatus 700 is comprised of a mobile phone is explained. But the present invention is not limited to this case. The data processing apparatus 700 may be composed of a mobile audio-visual terminal such as a portable music player.

Further, in the above embodiment, the case where the first wireless communication unit 140 and the second RF transmitting unit 240 execute wireless communication compliant with the Bluetooth specifications is explained. But the present invention is not limited to this case. The first wireless communication unit 140 and the second wireless communication unit 240 may execute wireless communication compliant with a wireless communication system which allows transmission of audio-visual data such as an infrared communication.

Moreover, in the above embodiment, the case where the data storage unit 110 is composed of a memory card is explained. But the present invention is not limited to this case. The data storage unit 110 may be composed of a storage medium capable of storing the audio-visual data such as a magnetic tape, a magnetic disk, a semiconductor memory, or a hard disk.

Further, in the above embodiment, the case where the data stored in the data storage unit 110 is the compressed audio data encoded in AAC is explained. But the present invention is not limited to this case. The data stored in the data storage unit 110 may be compressed data of digital audio data such as MP3 (MPEG Audio Layer-3) data.

Further, the data stored in the data storage unit 110 may be moving image data such as MPEG-4 video data or still image data such as JPEG (Joint Photographic Experts Group).

Additionally, the data stored in the data storage unit 110 may be a cryptograph encrypted in the DES (Data Encryption Standard) or the AES (Advanced Encryption Standard). In this case, the first signal processing unit 120 is configured so as to further perform an encryption decoding process.

Moreover, in the above embodiment, the case where the first signal processing unit 120 performs the decoding process of AAC, the SBC process, and the protocol process is explained. But the present invention is not limited to this case. The first signal processing unit 120 may perform a part of the above processes, so long as the data reproducing apparatus 800 can reproduce the data.

Additionally, in the above embodiment, the case where the second signal processing unit 220 performs the converting process to analog signals is explained. But, the present invention is not limited to this case. The second signal processing unit 220 may not perform the converting process to analog signals when the output unit of the second signal processing unit 220 is a unit which requires inputting digital data such as a liquid crystal display panel.

Further, in the above embodiment, the case where the first signal processing unit 120 performs the transcoding process from the AAC data to the SBC data is explained. But, the present invention is not limited to this case. The first signal processing unit 120 may perform following processes; a frequency converting process for converting the sampling frequency of original data so that the data reproducing apparatus 800 can reproduce the frequency converted data when the apparatus does not accept the sampling frequency of the original data, a spatial resolution converting process for converting the spatial resolution of original data so that the data reproducing apparatus 800 can reproduce the spatial resolution converted data when the apparatus does not accept the spatial resolution of the original data, a frame rate converting process for converting the frame rate of original data so that the data reproducing apparatus 800 can reproduce the frame rate converted data when the apparatus does not accept the frame rate of the original data, and a format converting process for converting the format of original data so that the data reproducing apparatus 800 can reproduce the format converted data when the apparatus does not accept the format of the original data.

Moreover, in the above embodiment, the case where the first signal processing unit 120 is composed of a DSP is explained. But, the present invention is not limited to this case. The first signal processing unit 120 may be composed of another type of processors such as a CPU (Central Processing Unit), or partially or wholly by hardware.

Further, in the above embodiment, the case where the data processing apparatus 700 processes 10 frames of the data during one operating time period is explained. But, the present invention is not limited to this case.

However, it is preferable that the number of frames to be processed during one operating time period be large, because an overhead process such as the clock control process and the power supply control process is required to transfer from an operating time period to a waiting time period or vice versa, and the load for performing the overhead process becomes significantly heavy when frequent transferring is necessary.

Additionally, in this embodiment, the case where the start-up control unit 180 performs the start-up control process in response to the data transmit request signal sent from the sending data monitoring unit 190 is explained. The data processing apparatus 700 of this embodiment, however, may comprise the trigger signal generating unit 170 as the same as that of the data processing apparatus 100 of the first embodiment, and may make the start-up control unit 180 to perform the start-up control process in response to the trigger signal generated in the trigger signal generating unit 170.

[Industrial Applicability]

The data processing apparatus according to the present invention is useful especially for an audio player and a video player installed in a mobile phone powered by batteries, and a mobile phone which can perform an audio-visual processing.

The invention claimed is:

1. A data transmitting apparatus for processing data to be transmitted to a data receiving apparatus which reproduces received data stored in a received data storage unit, comprising:
    a signal processor for processing data;
    a transmitter for wirelessly transmitting the data processed in said signal processor to said data receiving apparatus;
    a signal processing controller for controlling said signal processor to operate intermittently;
    a clock/power controller for restricting a clock signal supply and/or power supply to said signal processing controller during a non-operating time period of said intermittent operation;
    a wake-up controller for lifting the restriction put by said clock/power controller based on an amount of data stored in said received data storage unit; and
    a sending data storage unit for temporarily storing the data processed by said signal processor, wherein
    said transmitter wirelessly transmits the data processed by said signal processor and stored by said sending data storage unit to said receiving apparatus while said signal processor is processing another data,
    said transmitter wirelessly transmits the data to said receiving apparatus during an operating time period of said intermittent operation of signal processing by said signal processor, the data processed by said signal processor and stored by said sending data storage unit during a previous operating time period of said intermittent operation, and
    said transmitter stops wirelessly transmitting the data processed by said signal processor during the non-operating time period of said intermittent operation of said signal processor.

2. The data transmitting apparatus according to claim 1, wherein said processing data by said signal processor includes decoding said data.

3. A data transmitting method in a data transmitting apparatus of processing data to be transmitted to a data receiving apparatus which reproduces received data stored in a received data storage unit, comprising steps of:
    a signal processing step of processing data;
    a transmitting step of wirelessly transmitting the data processed at said signal processing step to said data receiving apparatus;
    a signal processing controlling step of controlling said signal processing step to operate intermittently;
    a clock/power controlling step of restricting a clock signal supply and/or power supply during a non-operating time period of said intermittent operation;
    a wake-up controlling step of lifting the restriction put at said clock/power controlling step based on an amount of data stored in said received data storage unit; and
    a sending data storing step of temporarily storing the data processed at said signal processing step, wherein
    said transmitting step includes wirelessly transmitting the data processed at said signal processing step and stored at said sending data storing step to said receiving apparatus while another data is processed at said signal processing step,
    said transmitting step includes wirelessly transmitting the data to said receiving apparatus during an operating time period of said intermittent operation of signal processing at said signal processing step, the data processed at said signal processing step and stored at said sending data storing step during a previous operating time period of said intermittent operation, and
    said transmitting step includes stopping wirelessly transmitting the data processed at said signal processing step during the non-operating time period of said intermittent operation of said signal processing step.

4. The data transmitting method according to claim 3, wherein said processing data in said signal processing step includes decoding said data.

* * * * *